A. H. WILLOUGHBY
Strainer for Faucets and Water Pipes.
No. 200,496. Patented Feb. 19, 1878.
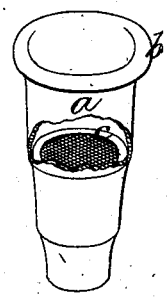
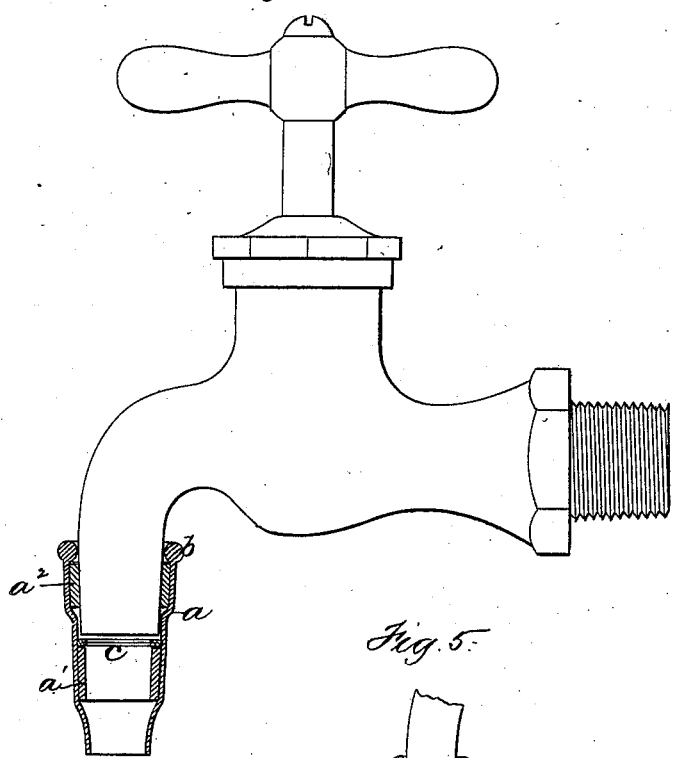
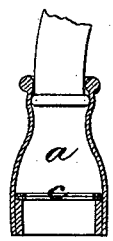
Witnesses.
E. B. Fairchild
Geo. W. Pierce
Inventor
A. H. Willoughby
by Wight & Brown
Attys

UNITED STATES PATENT OFFICE.

ALFRED H. WILLOUGHBY, OF LOWELL, MASSACHUSETTS.

IMPROVEMENT IN STRAINERS FOR FAUCETS AND WATER-PIPES.

Specification forming part of Letters Patent No. 200,496, dated February 19, 1878; application filed January 19, 1878.

*To all whom it may concern:*

Be it known that I, ALFRED H. WILLOUGHBY, of Lowell, in the county of Middlesex and State of Massachusetts, have invented certain Improvements in Strainers for Faucets and Water-Pipes, of which the following is a specification:

This invention relates to attachable and detachable strainers for application to the discharge ends of faucets, water-pipes, &c.; and has for its object to provide a cheap and simple strainer, which will adapt itself to various sizes of faucets or pipes, and is capable of being easily applied and removed.

To this end the invention consists in a strainer composed of an elastic tube or holder adapted to be applied to the end of a faucet or water-pipe, and provided with a sieve constituting a partition in said elastic tube, as I will now proceed to describe.

Of the accompanying drawings, forming a part of this specification, Figure 1 represents a perspective view of my improved strainer, a portion of the rubber tube being broken away to show the sieve. Fig. 2 represents a top view of the sieve detached. Fig. 3 represents a perspective view of one of the rubber rings detached. Fig. 4 represents a sectional view of my improved strainer applied to a faucet. Fig. 5 represents a sectional view of a modified form of the elastic tube or holder.

Similar letters of reference refer to like parts in all the figures.

In said drawings, $a$ represents the elastic holder, which is composed of rubber in the form of a tube, and is preferably provided with a bead, $b$, at its upper end. $c$ represents the sieve, which I prefer to make of fine wire-cloth inclosed in a metallic circular mat. The sieve is of such diameter as to fit somewhat closely in the interior of the holder $a$ and form a partition in said holder. I prefer to provide a rubber ring, $a^1$, to support the sieve $c$, said ring being cemented or otherwise attached to the interior of the holder $a$, as shown in Figs. 4 and 5, and constituting a shoulder or flange on which the mat or margin of the sieve rests.

It will be seen that the tube or holder $a$ is adapted to be applied to the end of a faucet or pipe, so as to form a continuation of the same, as shown in Figs. 4 and 5, the water discharged from said faucet or pipe passing through the tube or holder, and being strained by the sieve $c$. In case the faucet or pipe has a smooth periphery at the end to which the holder $a$ is applied, I prefer to interpose an elastic rubber ring, $a^2$, between the periphery of the faucet or pipe and the inclosing portion of the holder $a$, as shown in Fig. 4, this ring being preferably shrunk onto the pipe or faucet before the holder $a$ is applied. The ring $a^2$ clings closely to the faucet or pipe, and forms a collar which distends the portion of the holder $a$ which incloses the end of the faucet or pipe, and effectually prevents the forcing of the holder off from the end of the faucet or pipe by the pressure of the water against the sieve. When the holder is applied to a pipe that has a beaded end, as shown in Fig. 5, or to a threaded pipe, the ring $a^2$ will be unnecessary, the bead $b$ of the holder being sufficient to keep said holder in place. For small pipes or faucets I prefer to make the holder with a contracted upper end, as shown in Fig. 5.

From the foregoing it will be seen that my invention constitutes a device that is cheap, simple, and effective, and can be easily applied to faucets or pipes of various sizes without special adaptation to any particular size.

I claim as my invention—

1. An elastic tube adapted to be applied to a pipe or faucet, and provided with a detachable sieve inclosed in said tube, as set forth.

2. The elastic tube or holder $a$, provided with a supporting ring or flange, $a^1$, combined with a sieve, $c$, resting on said ring, as set forth.

3. The elastic tube or holder provided with sieve $c$, combined with an elastic ring, $a^2$, as set forth.

In testimony whereof I have signed my name to this specification in the presence of two subscribing witnesses.

ALFRED H. WILLOUGHBY.

Witnesses:
GEO. W. PIERCE,
C. F. BROWN.